(12) United States Patent
Kobres

(10) Patent No.: US 9,824,368 B2
(45) Date of Patent: Nov. 21, 2017

(54) CUSTOMIZED KIOSK MODES OF OPERATION

(75) Inventor: Erick Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 850 days.

(21) Appl. No.: 12/913,415

(22) Filed: Oct. 27, 2010

(65) Prior Publication Data

US 2012/0110311 A1    May 3, 2012

(51) Int. Cl.
*G06Q 30/02*    (2012.01)

(52) U.S. Cl.
CPC .................... *G06Q 30/02* (2013.01)

(58) Field of Classification Search
USPC ............ 705/14.1–14.6, 14.11–14.73
See application file for complete search history.

(56) References Cited

U.S. PATENT DOCUMENTS

| | | | | |
|---|---|---|---|---|
| 5,606,154 A * | 2/1997 | Doigan | ...................... | B66B 3/00 187/393 |
| 6,536,658 B1 | 3/2003 | Rantze | | |
| 7,305,442 B1 * | 12/2007 | Lundy | ..................... | G06Q 30/02 455/412.1 |
| 7,628,324 B2 * | 12/2009 | Barry | ..................... | G06Q 10/02 235/381 |
| 7,680,689 B2 * | 3/2010 | Nielsen | .................. | G06Q 30/02 235/379 |
| 2002/0055880 A1 * | 5/2002 | Unold | ..................... | G06Q 30/02 705/14.61 |
| 2002/0116265 A1 * | 8/2002 | Hernandez | ............. | G06Q 30/02 705/14.52 |
| 2004/0044574 A1 * | 3/2004 | Cochran | ................. | G06Q 30/02 705/14.57 |
| 2004/0193313 A1 | 9/2004 | Cornet et al. | | |
| 2006/0000903 A1 * | 1/2006 | Barry | ..................... | G06Q 10/02 235/385 |
| 2008/0172243 A1 * | 7/2008 | Kelly | ................. | G06Q 30/0251 705/14.49 |
| 2008/0249868 A1 * | 10/2008 | Angell | .................... | G06Q 30/02 705/14.53 |
| 2009/0198557 A1 * | 8/2009 | Wang | ..................... | G06Q 30/02 705/14.61 |

FOREIGN PATENT DOCUMENTS

WO    2009105707 A2    8/2009

* cited by examiner

*Primary Examiner* — Jeffrey Zimmerman
(74) *Attorney, Agent, or Firm* — Schwegman, Lundberg & Woessner

(57) ABSTRACT

Techniques for customized kiosk modes of operation are provided. A kiosk is configured to recognize periods of operation that are slow, moderate, or busy. A number of factors can be used to automatically recognize these periods and change the periods on demand. For each type of period (slow, moderate, or busy), the kiosk uses a different customized mode of operation so as to optimally use the kiosk for the benefit of the kiosk owner, customers interfacing with the kiosk, and marketers selling advertisements via the kiosk.

20 Claims, 3 Drawing Sheets

CUSTOMIZED KIOSK MODES OF OPERATION

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In fact, customers perform self-service transactions every day. Kiosks and other self-service devices provide easy-to-use interfaces, which are designed to be used by the widest range of users, from first timers to frequent users. For example, in air travel, the check-in activity is often carried out via a self-service kiosk, web check-in application, or through a mobile device Typically, Kiosks have just a few modes of operation that are dependent upon whether a customer is interfacing with the kiosk or whether a support person is accessing an administrative mode of the kiosk.

For example, kiosks in airports go through cycles of "rush" and "idle" based on customer traffic patterns. Kiosk operators desire the ability to achieve maximum throughput during rush periods, but would like to drive additional utilization during periods when kiosks may otherwise be sitting idle. Likewise, consumers have varying availability of free time, and may or may not be in a hurry when they approach a kiosk for a transaction. Thus, aggressive kiosk marketing toward a traveler who is running late for a flight can serve as a source of frustration and can result in a poor consumer experience.

Customized experiences for kiosk operators (enterprises), customers, and even marketers cannot be achieved with today's kiosk technology. As a result, enterprises cannot optimize their kiosk usage, consumers are often frustrated with kiosk interactions at different points in time, and marketers feel their advertisements are not as effective as they might be in a different scenario.

SUMMARY

In various embodiments, techniques for customized kiosk modes of operation are presented. According to an embodiment, a method for customizing the modes of operation for a kiosk is provided.

Specifically, factors are evaluated to determine load usage at the self-service device. Next, a mode of operation for the self-service device is configured to interact with a customer based on the load usage. Finally, the self-service device interacts with the customer in the mode of operation.

DETAILED DESCRIPTION

Figure 1:
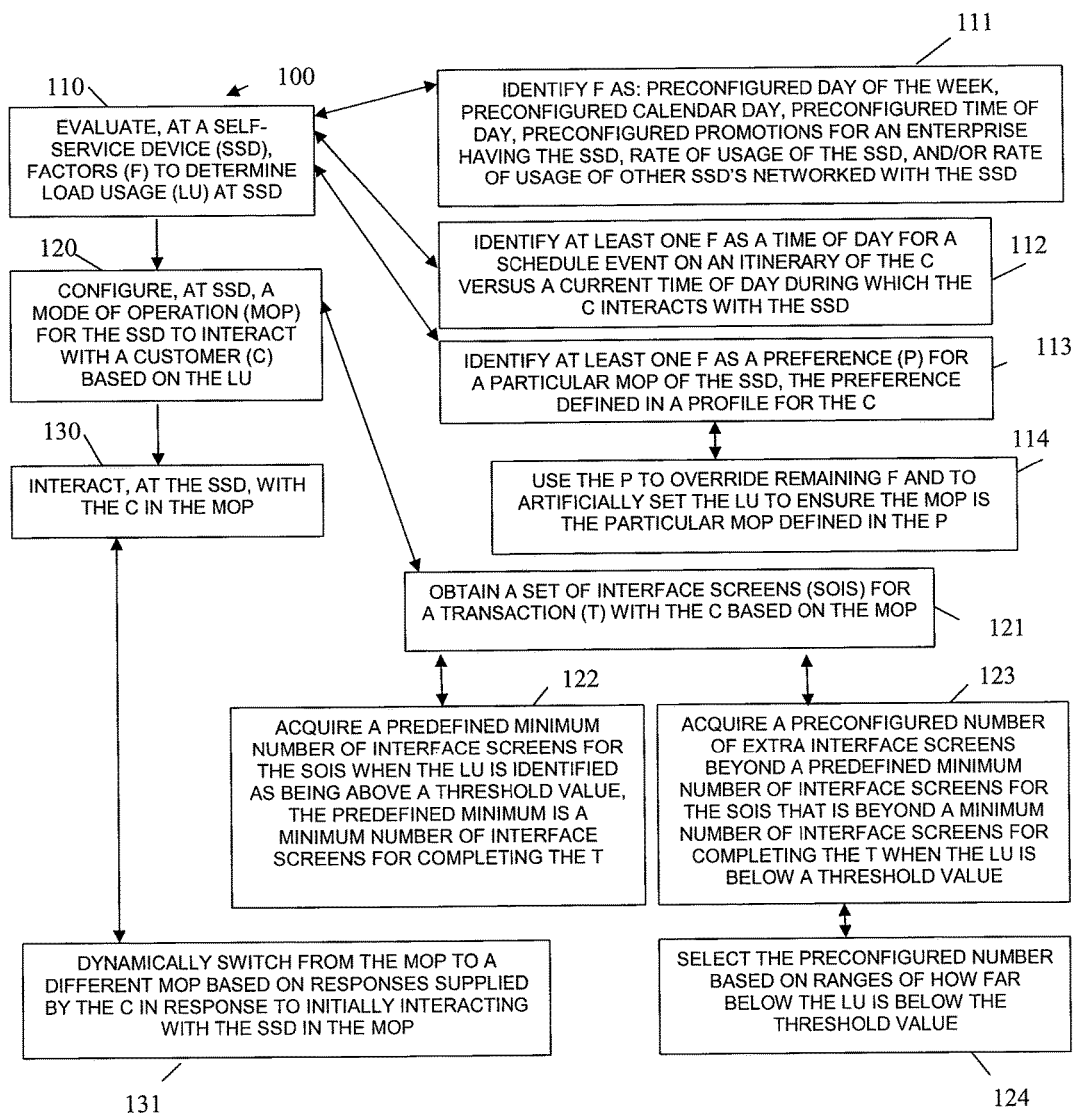
FIG. 1 is a diagram of a method for customizing the modes of operation for a kiosk, according to an example embodiment.

FIG. 1 is a diagram of a method 100 for customizing the modes of operation for a kiosk, according to an example embodiment. The method 100 (hereinafter "customized kiosk mode of operation service") is implemented as instructions programmed and residing on a non-transitory computer-readable (processor-readable) storage medium and executed by one or more processors. The processors are specifically configured and programmed to process the customized kiosk mode of operation service. The customized kiosk mode of operation service operates over a network. The network is wired, wireless, or a combination of wired and wireless.

The customized kiosk mode of operation service executes on one or more processors of a self-service device or a kiosk (the terms self-service device and kiosk may be used interchangeably herein and below).

Various embodiments presented herein describe techniques whereby kiosk platforms and applications can be made aware of the load (estimated backlog of users) on the overall system of kiosks as well as the current schedule state of the current user.

During idle periods, and for travelers who are not pressed for time, kiosks can automatically change their attract screens or application behaviors to market services on behalf of the kiosk operator, maximizing the revenue return for the kiosks during these periods. Likewise, during busy periods or for passengers with little time, the kiosk is "all business," optimizing navigation and application flow for optimum throughput.

Examples of services that are available (or more prominent) during slow periods include:
- Surveys
- Loyalty program enrollment
- On-site services marketing (clubs, shops, restaurants, etc.)
- Ancillary services marketing (insurance, upgrades, meals, etc.)
- Informational messages (offers to print or display directions to the gate, etc.)

The techniques herein can be configured to determine the operating mode based on a number of criteria including, but not necessarily limited to:

Environmental:
- Rate of usage of the specific kiosk
- Rate of usage of nearby kiosks
- Pre-configured time-of day/day-of-week, holiday, etc.
- Unscheduled events (irregular airport operations, such as weather)
- Other site-specific variables Traveler:
- Elected preferences (expert user profile, for example)
- Time remaining until departure
- Current security checkpoint wait times
- Estimated time required to travel to the departure gate, etc.
- Domestic versus international travel (time for customs, international document check, etc.)
- Flight delays
- Other traveler-specific variables The techniques herein make use of a configurable rules engine, which can take any number of input variables, such as the examples above, and evaluate and apply correct kiosk operating mode based on them.

Kiosk operation modes are configurable, based on the needs of the installation and the capabilities of the kiosk platform and the kiosk applications. Operation mode of the platform and applications can be distinct, and can be adaptive to the current user.

Examples of operating modes include, but are not necessarily limited to:
- Rush—the kiosk should take measures to minimize transaction times
- Moderate—the kiosk can apply moderate attract, marketing and selling tactics
- Slow—the kiosk can apply the most aggressive attract, marketing and selling tactics
- IROP (Irregular Operations)—the kiosk may highlight applications appropriate to rebooking or other appropriate actions Examples of customer modes include, but are not necessarily limited to:
- Rushed—traveler will be pressed to make their flight
- Comfortable—traveler has arrived with moderate spare time before the flight
- Early—traveler has arrived with significant spare time before the flight The techniques presented herein distinguish between kiosk modes and passenger modes. The configurable rules are set up to ensure that the most urgent scenario applies. So, if a traveler is in a hurry, even though the kiosk is in the "Slow" mode, the applications take measures to ensure the traveler encounters no unnecessary steps during their check-in. Likewise, if the airport lobby is in a rush period, the technique may not employ all or even any optional steps, even if the traveler has spare time.

It is noted that the above is described from the standpoint of a traveler at a particular kiosk or self-service device, such as an airport kiosk; however, other embodiments can be used for different enterprise kiosks, such as at rental car facilities, at hotel facilities, or even at facilities not necessarily related to a traveler, such as a grocery store or a sporting event and the like.

It is within this context and example overview that these embodiments and other embodiments of the invention are now discussed in greater detail with reference to the FIGS. 1-3 and starting here with the discussion of the FIG. 1.

At 110, the customized kiosk mode of operation service evaluates, at a self service device, factors for determining load usage at the self service device. Here, "load usage" is intended to mean a current state of the self-service device and its surrounding physical environment and operations of an enterprise occurring within the physical environment. So, it may be that the real load is not so high by when considering the factors of existing events and planned events the load usage can be significantly higher.

It is also noted that evaluating of the factors occur before a customer approaches the self-service device for interacting with the self-service device to conduct a transaction. But, the factors are continually being dynamically evaluated in real time to maximize usage of the kiosk in a most optimal manner. So, the factors continual to be evaluated when the customer initially interacts with the kiosk and perhaps while the customer is conducting the transaction. Factors are dynamically and in real time evaluated on continual bases to make it efficient for the enterprise owning or operating the self-service device, to make it pleasurable for the customer, and to make it profitable for marketers that are also utilizing the self-service device.

A variety of factors that are evaluated in a dynamic fashion was presented above.

For example, at 111, the customized kiosk mode of operation service identifies the factors as one or more of: a preconfigured day of the week, a preconfigured calendar day, a preconfigured time of day, preconfigured promotions for the enterprise or for marketers, rate of usage for the self-service device, and/or rate of usage of other self service devices networked with the self-service device.

According to an embodiment, at 112, the customized kiosk mode of operation service identifies at least one factor as a time of day for a scheduled event on a travel itinerary of the customer versus a current time of day during which the customer is interacting with the self-service device.

In another case, at 113, the customized kiosk mode of operation service identifies at least one factor as a preference for a particular mode of operation of the self-service device. The preference is defined in a profile registered for the customer. In some cases, the customer can be enticed to have a preference that permits more marketing during a mode of operation for the self-service device, this can be done by providing rewards to select customers to endure extra marketer. Alternatively, some customers may not want to experience any marketing under any circumstances and such a situation can be honored as well.

Continuing with the embodiment of 113 and at 114, the customized kiosk mode of operation service uses the preference of the customer to effectively and dynamically override remaining factors that are being evaluated. This can artificially set the load usage to a value that ensures that the mode of operation for the self-service device is a particular mode of operation defined in the customer's preference.

At 120, the customized kiosk mode of operation service configures a mode of operation for the self-service device to custom interact with the customer based on the load usage (again this can be overridden in some instances and set to an artificial value to ensure a desired mode of operation is achieved, such as the situation described at 114).

In an embodiment, at 121, the customized kiosk mode of operation service obtains a set of interface screens for a transaction with the customer based on the mode of operation configured in the self-service device. The set of interface screens can include informational content, marketing information, selling opportunities, all of these, or none of these. In addition, the set of interface screens include enough interface screens to at least complete the transaction for the customer via the self-service device.

Continuing with the embodiment at 121 and at 122, the customized kiosk mode of operation service acquires a predefined minimum number of interface screens for the set of interface screens when the load usage is identified as being above a threshold value. The predefined minimum is a minimum number of interface screens for completing the transaction.

Continuing still with the embodiment at 121 and at 123, the customized kiosk mode of operation service acquires a preconfigured number of extra interface screens beyond a predefined minimum number of interface screens for the set of interface screens that is beyond a minimum number of interface screens for completing the transaction when the load usage is below a threshold value. Here, marketing, informational, and/or selling opportunities are provided in the extra screens, as discussed above and also below with reference to the FIG. 2.

Continuing with the embodiment of 123 and at 124, the customized kiosk mode of operation service selects the preconfigured number of extra screens based on ranges of how far below the load usage is below the threshold value. So, the lower the load usage the more screens can be provided and this can be achieved via the use of configured ranges compared against the load usage and the threshold value.

At 130, the customized kiosk mode of operation service interacts, at the self-service device, with the customer using or in the mode of operation configured at 120.

According to an embodiment, at 131, the customized kiosk mode of operation service dynamically switches from the mode of operation to a different or modified mode of operation based on responses supplied by the customer when interacting with the self-service device. So, the customer may opt out of some screens or all screens not relevant or not of interest to the customer and opt for immediately completing the transaction, this dynamically changes the configured mode of operation to a new mode or modified mode. When this occurs a log may be maintained for subsequent analysis as some modes may be too cumbersome for customers and may need revised.

Figure 2:
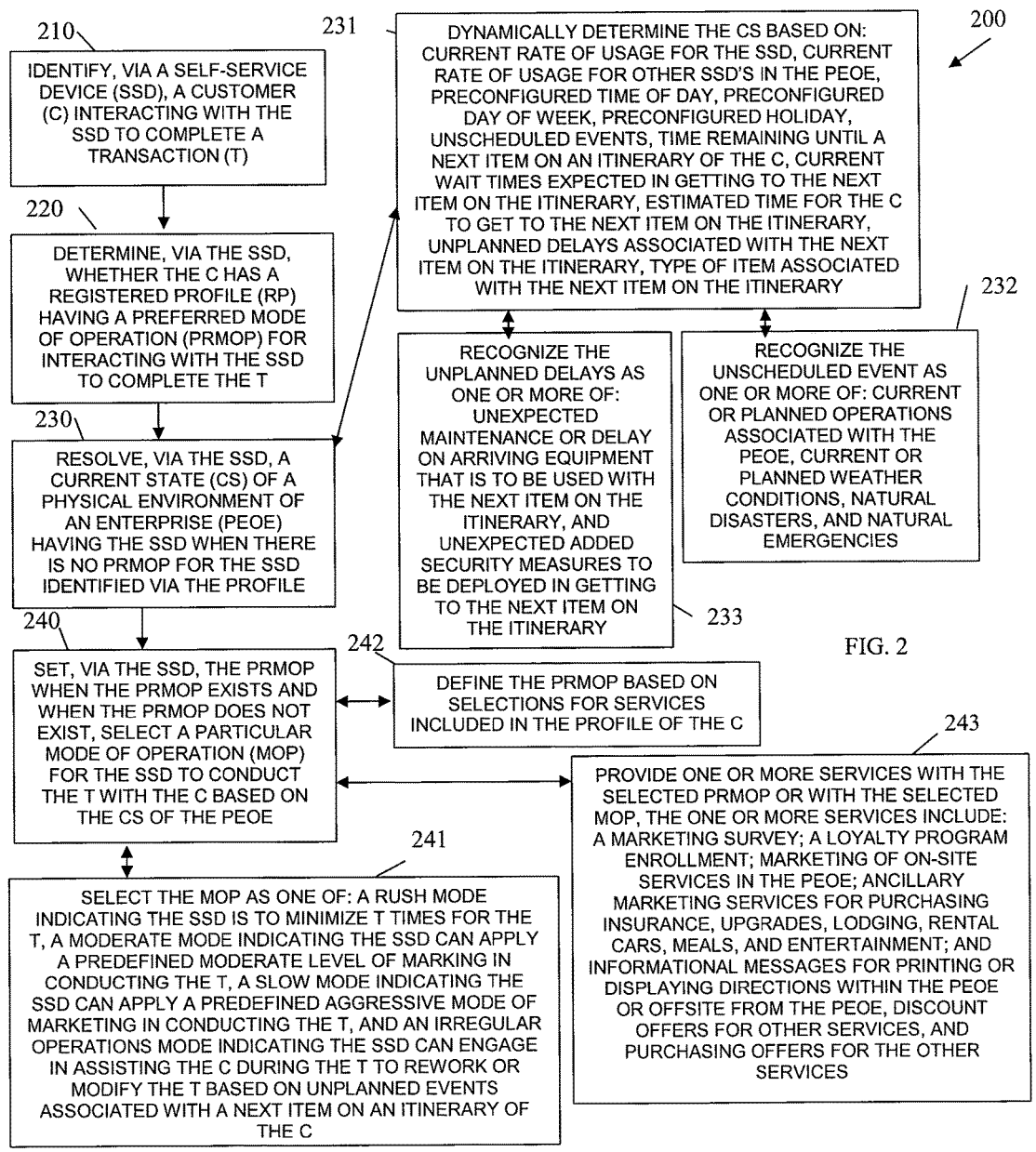
FIG. 2 is a diagram of another method for customizing the modes of operation for a kiosk, according to an example embodiment.

FIG. 2 is a diagram of another method 200 for customizing the modes of operation for a kiosk, according to an example embodiment. The method 200 (hereinafter "customized mode-of-operation service") is implemented as instruction and programmed within a non-transitory computer-readable (processor-readable) storage medium that executes on one or more processors of a self-service device (e.g., kiosk, etc.); the processors of the self-service device are specifically configured to execute the customized mode-of-operation service. The customized mode-of-operation service is operational over a network; the network is wired, wireless, or a combination of wired and wireless.

The customized mode-of-operation service another and in some ways enhanced perspective of the customized kiosk mode of operation service, represented by the method 100 of the FIG. 1.

At 210, the customized mode-of-operation service identifies, via a self-service device, a customer interacting with the self-service device to complete a transaction. Here, the customer scans a barcode, enters a PIN, or provides other initial identifying information that permits the self-service device to identify the customer.

At 220, the customized mode-of-operation service determines, via the self-service device, whether the customer has a registered profile having a preferred mode of operation for interacting with the self-service device to complete the transaction. It may be that the customer is new to the enterprise or that the customer has never registered a profile so a determination may yield that there is no preferred mode of operation. It may also be that a profile exists but that there is no preferred mode of operation in the profile.

At 130, the customized mode-of-operation service resolves, via the self-service device a current state of a physical environment of an enterprise having (owning, operating, and/or managing) the self-service device when there is no preferred mode of operation identified in the profile for the customer interacting with the self-service device.

According to an embodiment, at 231, the customized mode-of-operation service dynamically determines the current state of the physical environment based on: current rate of usage for the self-service device, current rate of usage for other self-service devices in the physical environment, preconfigured time of day, preconfigured day of week, preconfigured holiday, unscheduled events, time remaining until a next item on an itinerary of the customer, current wait times expected in getting to the next item on the itinerary, estimated time for the customer to get to the next item on the itinerary, unplanned delays associated with the next item on the itinerary, and/or a type of item associated with the next item on the itinerary.

Continuing with the embodiment at 231 and at 232, the customized mode-of-operation service recognizes the unscheduled event as one or more of: current or planned operations associated with the physical environment of the enterprise, current or planned weather conditions, natural disasters, and/or natural emergencies.

Continuing with the embodiment at 231 and at 233, the customized mode-of-operation service recognizes the unplanned delays as one or more of: unexpected maintenance or delay on arriving equipment that is to be used with the next item on the itinerary, and/or unexpected added security measures to be deployed in getting to the next item on the itinerary.

At 240, the customized mode-of-operation service sets, via the self-service device, the preferred mode of operation when the preferred mode of operation exists. Yet, when the preferred mode of operation does not exists, the customized mode-of-operation service selects a particular mode of operation for the self-service device to conduct the transaction with the customer based on the resolved current state of the physical environment of the enterprise.

In an embodiment, at 241, the customized mode-of-operation service selects the particular mode of operation as one of: a rush mode indicating the self-service device is to minimize transaction times for the transaction, a moderate mode indicating the self-service device can apply a predefined moderate level of marking in conducting the transaction, a slow mode indicating the self-service device can apply a predefined aggressive mode of marketing in conducting the transaction, and an irregular operations mode indicating the self-service device can engage in assisting the customer during the transaction to rework or modify the transaction based on unplanned events associated with a next item on an itinerary of the customer.

In another case, at 242, the customized mode-of-operation service defines the preferred mode of operation based on selections for services included in the profile of the customer. So, the actual mode of operation may not be explicitly defined in the profile (although in some embodiments it may be), rather the customized mode-of-operation service evaluates desired services included in the profile and dynamically assembles what is needed to achieve the preferred mode of operation on the self-service device for the customer.

In yet another situation, at 243, the customized mode-of-operation service provides one or more services with the selected preferred mode of operation or with the selected particular mode of operation, the one or more services include: a marketing survey; a loyalty program enrollment; marketing of on-site services in the physical environment of the enterprise; ancillary marketing services for purchasing insurance, upgrades, lodging, rental cars, meals, and entertainment; and informational messages for printing or displaying directions within the physical environment or offsite from the physical environment, discount offers for other services, and purchasing offers for the other services.

Figure 3:
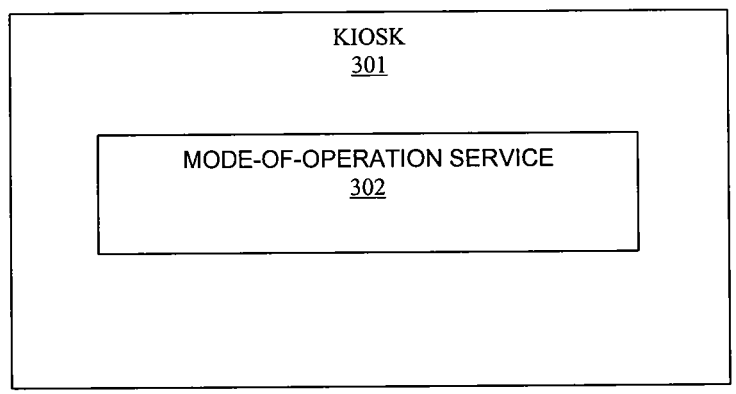
FIG. 3 is a diagram of a customized mode of operation kiosk system, according to an example embodiment.

FIG. 3 is a diagram of a customized mode-of-operation kiosk system 300, according to an example embodiment. The customized mode-of-operation kiosk system 300 includes one or more processors that are specifically configured to perform, inter alis, the processing associated with the methods 100 and 200 of the FIGS. 1 and 2, respectively. The customized mode-of-operation kiosk system 300 may also include a variety of other hardware components, such as network adapters, memory, display screen(s), input mechanisms, and the like. Furthermore, the customized mode-ofoperation kiosk system 300 is operational over a network and the network can be wired, wireless, or a combination of wired and wireless.

The customized mode-of-operation kiosk system 300 includes a kiosk 301 and a mode-of-operation service 302. Each of these and their interactions with one another will now be discussed in turn.

The kiosk 301 has one or more processors, memory, storage, a display, network connections, and a variety of input devices. The kiosk 301 is a self-service device located in a physical environment of an enterprise and used by a customer to perform a self-service transaction associated with an enterprise.

The mode-of-operation service 302 is programmed and resides in a non-transitory computer-readable medium and executes on the processors of the kiosk 301. Example processing associate with the mode-of-operation service 302 was presented above with reference to the methods 100 and 200 of the FIGS. 1 and 2, respectively.

The kiosk 301 is configured to complete transactions with customers using multiple customized modes of operation.

The mode-of-operation service 302 is configured to dynamically select a particular mode of operation for a particular customer during a particular transaction with the kiosk 301 based on multiple factors that are dynamically and in real time evaluated by the mode-of-operation service 302 before the customer ever approaches the kiosk 301 for the particular transaction and during initial interaction with the particular customer at the start of the particular transaction. In fact, throughout the customer interaction with the kiosk 301 the mode-of-operation service 302 can dynamically and in real time evaluate the factors in such a way to modify a selected mode of operation or change to a different mode of operation during the transaction.

According to an embodiment, the factors include: conditions associated with a physical environment of an enterprise having the kiosk 301, conditions associated with business operations of the enterprise, conditions associated with preferences associated with the particular customer, and predefined unexpected events dynamically discoverable by the mode-of-operation service 302.

Continuing with the previous embodiment the kiosk 301 is also configured to network with information systems of the enterprise and with other kiosks of the enterprise to identify and discover the conditions. Some conditions the kiosk 301 can independently resolve without network communications, others may use network communications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising:
a plurality of self-service devices configured to provide services in a travel environment, the self-service devices sharing information with each other regarding load usage;
each self-service device including one or more processors, and instructions for a executing a processor-implemented method of operating self-service device, the instructions programmed in a non-transitory processor-readable medium and configured to be executed as the method on the one or more processors, wherein each self-service device is configured to provide services including:
evaluating, by the self-service device, load usage factors at the self-service device, the evaluating of load usage factors including evaluating the rate of usage of other self-service devices that are associated with a network of the self-service device;
managing throughput of transactions on the self-service device by configuring a throughput mode of operation for the self-service device, the mode of operation selected using the load usage factors, wherein more services are available in a low throughput mode of operation than in a high throughput mode of operation, the low throughput mode corresponding to longer transaction times than the high throughput mode;
receiving information from a customer and determining a current schedule of the customer;
adjusting, by the self-service device, the throughput mode of operation based at least in part on the current schedule of the customer, the throughput mode being adjustable to increase throughput to reduce a particular transaction time for the customer while at the self-service device, and the throughput mode of operation not being adjustable to reduce throughput below the mode of operation selected using the load usage factors; and
interacting, by the self-service device, with the customer in the adjusted throughput mode of operation.

2. The system of claim 1, wherein evaluating load usage factors further includes evaluating one or more of a preconfigured day of the week, a preconfigured calendar day, a preconfigured time of day, and preconfigured promotions for the enterprise.

3. The system of claim 1, wherein determining the current schedule of the customer includes comparing a time of day for a schedule event on an itinerary of the customer versus a current time of day during which the customer interacts with the self-service device.

4. The system of claim 1, wherein evaluating further includes identifying at least one factor as a preference for a particular mode of operation of the self-service device, the preference defined in a profile for the customer.

5. The system of claim 4, wherein identifying further includes using the preference to override remaining factors and to artificially set the load usage to ensure the mode of operation is the particular mode of operation defined in the preference.

6. The system of claim 1, wherein configuring further includes obtaining a set of interface screens for a transaction with the customer based on the adjusted mode of operation.

7. The system of claim 6, wherein obtaining further includes acquiring a predefined minimum number of interface screens for the set of interface screens when the load usage is identified as being above a threshold value, the predefined minimum is a minimum number of interface screens for completing the transaction.

8. The system of claim 6, wherein obtaining further includes acquiring a preconfigured number of extra interface screens beyond a predefined minimum number of interface screens for the set of interface screens that is beyond a minimum number of interface screens for completing the transaction when the load usage is below a threshold value.

9. The system of claim 8, wherein acquiring further includes selecting the preconfigured number based on ranges of how far below the load usage is below the threshold value.

10. The system of claim 1, wherein interacting further includes dynamically switching from the adjusted mode of operation to a different mode of operation based on responses supplied by the customer in response to initially interacting with the self-service device in the adjusted mode of operation.

11. A processor-implemented method programmed in a non-transitory processor-readable medium and to execute on one or more processors configured to execute the method, comprising:
identifying, by a self-service device, a customer interacting with the self-service device to complete a transaction, the customer providing identifying information to identify the customer when the customer initiates the transaction;
determining, by the self-service device, whether the customer has a registered profile having a preferred throughput mode of operation for interacting with the self-service device to complete the transaction;
resolving, by the self-service device, a current state of a physical environment of an enterprise having the self-service device when there is no preferred mode of operation for the self-service device identified via the profile, the current state also including a particular state of the self-service device and the rate of usage of other self-service devices that are associated with a network of the self-service device; and
setting, by the self-service device, the preferred throughput mode of operation when the preferred throughput mode of operation exists, and when the preferred mode of operation does not exist, selecting a particular throughput mode of operation for the self-service device to conduct the transaction with the customer based on the current state of the environment for the enterprise, and adjusting the preferred throughput mode of operation based on a schedule of the customer by altering a transaction time for the transaction, the throughput mode being adjustable to increase throughput to reduce a particular transaction time for the customer while at the self-service device, and the throughput mode of operation not being adjustable to reduce throughput below the mode of operation selected based on the current state of the environment.

12. The method of claim 11, wherein resolving further includes dynamically determining the current state of the physical environment based on: current rate of usage for the self-service device, current rate of usage for other self-service devices in the physical environment, preconfigured time of day, preconfigured day of week, preconfigured holiday, unscheduled events, time remaining until a next item on an itinerary of the customer, current wait times expected in getting to the next item on the itinerary, estimated time for the customer to get to the next item on the itinerary, unplanned delays associated with the next item on the itinerary, and a type of item associated with the next item on the itinerary.

13. The method of claim 12, wherein dynamically determining further includes recognizing the unscheduled event as one or more of: current or planned operations associated with the physical environment of the enterprise, current or planned weather conditions, natural disasters, and natural emergencies.

14. The method of claim 12, wherein dynamically determining further includes recognizing the unplanned delays as one or more of: unexpected maintenance or delay on arriving equipment that is to be used with the next item on the itinerary, and unexpected added security measures to be deployed in getting to the next item on the itinerary.

15. The method of claim 11, wherein setting further includes selecting the particular mode of operation as one of: a rush mode indicating the self-service device is to minimize transaction times for the transaction, a moderate mode indicating the self-service device can apply a predefined moderate level of marking in conducting the transaction, a slow mode indicating the self-service device can apply a predefined aggressive mode of marketing in conducting the transaction, and an irregular operations mode indicating the self-service device can engage in assisting the customer during the transaction to rework or modify the transaction based on unplanned events associated with a next item on an itinerary of the customer.

16. The method of claim 11, wherein setting further includes defining the preferred mode of operation based on selections for services included in the profile of the customer.

17. The method of claim 11, wherein setting further includes providing one or more services with the selected preferred mode of operation or with the selected particular mode of operation, the one or more services include: a marketing survey; a loyalty program enrollment; marketing of on-site services in the physical environment of the enterprise; ancillary marketing services for purchasing insurance, upgrades, lodging, rental cars, meals, and entertainment; and informational messages for printing or displaying directions within the physical environment or offsite from the physical environment, discount offers for other services, and purchasing offers for the other services.

18. A system, comprising:
a kiosk having one or more processors; and
a mode-of-operation service programmed and residing in a non-transitory computer-readable medium and executing on the one or more processors of the kiosk;
the kiosk configured to complete transactions with customers using multiple throughput modes of operation, the mode-of-operation service configured to dynamically select a particular throughput mode of operation for a particular customer during a particular transaction with the kiosk based on multiple factors that are dynamically evaluated by the mode-of-operation service before the particular customer approaches the kiosk for the particular transaction, wherein at least some factors are relevant to a current state of: the kiosk, a physical environment of the kiosk, the rate of usage of other kiosks that are associated with a network of kiosk, and operations of an enterprise occurring within the physical environment, and wherein the particular throughput mode of operation is dynamically selected based on initial interaction with the particular customer at the start of the particular transaction and wherein the mode-of-operation service is further configured to adjust the particular throughput mode of operation based on a schedule of the particular customer by altering a transaction time for the particular transaction, the throughput mode being adjustable to increase throughput to reduce a particular transaction time for the particular customer while at the kiosk, and the throughput mode of operation not being adjustable to reduce throughput below the mode of operation selected before the particular customer approached the kiosk.

19. The system of claim 18, wherein factors include: conditions associated with a physical environment of the enterprise having the kiosk, conditions associated with business operations of the enterprise, and predefined unexpected events dynamically discoverable by the mode-of-operation service.

20. The system of claim 19, wherein the kiosk is configured to network with information systems of the enterprise and with other kiosks of the enterprise to identify and discover the conditions.

\* \* \* \* \*